Sept. 19, 1950  G. A. TINNERMAN  2,523,239
FASTENING DEVICE
Filed Jan. 10, 1947

Inventor
George A. Tinnerman,
H. G. Lombard
Attorney

Patented Sept. 19, 1950

2,523,239

UNITED STATES PATENT OFFICE 2,523,239

FASTENING DEVICE

George A. Tinnerman, Cleveland, Ohio, assignor to Tinnerman Products, Inc., Cleveland, Ohio, a corporation of Ohio Application January 10, 1947, Serial No. 721,394

7 Claims. (Cl. 85—5)

This invention relates to improvements in snap stud fasteners for securing installations composed of relatively thick parts which require a fastener having a comparatively long shank adapted to be easily and quickly sprung into applied fastening position in an opening in a panel or other support.

More particularly, the invention deals with an improved snap stud fastener having a relatively long shank which is provided with one or more series of positive holding means extending longitudinally thereof and adapted to secure the fastener in a panel opening or the like at any one of several locations along the shank thereof depending on the combined thickness of the parts secured.

Many types of snap stud fasteners are provided by a relatively extensive progressive die drawing operation which often is impractical in the case of a fastener requiring a comparatively long shank inasmuch as such a shank cannot be drawn or pressed from ordinary sheet metal to the required length without the use of special expensive equipment which frequently makes the cost of the fasteners prohibitive.

However, such fasteners are easily and cheaply manufactured from ordinary sheet metal strip stock by providing the shank in the general design of a channel shape formed from a lengthwise section of the strip and, of course, in any desired length and cross-sectional area required. Snap stud fasteners of this character having generally channel-shaped shank constructions are disclosed in United States Patent Number 2,110,959, issued March 15, 1938, and, in this regard, fasteners in accordance with the present disclosure are manufactured under this patent. The snap stud fasteners of the present invention embody various improvements over the devices of this patent in their overall construction and particularly in the formation of the head member of the fastener either alone or in combination with the generally channel-shaped construction of the fastener shank, as aforesaid.

A snap stud fastener of the kind described has a wide range and variety of uses and one important application thereof has to do with the securing of a padding or layer of insulation material to the dash of an automobile or a similar part of a housing, cabinet, or the like. Often such an insulation pad is quite thick in order to prevent the passage of objectionable heat, odor, and annoying sounds from the motor to the interior of the car body, and consequently, a fastener having a relatively long shank is required. The pad is usually concealed by a finish covering of trim material secured therewith to the dash by the forwards ends of the fasteners projecting into the area in which the motor is located under the hood of the automobile and, in this relation, it is especially desirable that the projecting shank portions of the fasteners be as short as possible in order to eliminate possible tangling of ignition wires, etc., therewith, and otherwise to minimize possibility of the fasteners becoming accidentally dislodged or displaced from applied fastening position by one having occasion to work under the hood of the automobile.

A primary object of the invention is to provide an improved snap stud fastener of the kind described that may be made from standard sheet metal strip stock by simple bending and forming operations in a relatively simple design comprising a generally channel-shaped shank of any desired length and cross-section and with the securing means thereon in proximity to the pilot or leading end of the fastener such that in an installation there is presented a relatively short projecting shank portion for the aforesaid purposes, and with the head of the fastener provided by an extension on one end of the shank together with means connecting the head to the shank at spaced points to provide for increased strength and rigidity of the head in the completed fastener.

A further object of the invention is to provide such a fastener construction in which the connection of the shank to the head of the fastener adds to the effectiveness of the holding action of the generally channel-shaped shank in applied fastening position.

Another object of the invention is to provide an improved fastener of the kind described in which the head of the completed fastener is imperforate to seal the opening through which the fastener is applied.

A further object of the invention is to provide an improved head construction for a stud fastener of any nature in which the head is integrally formed on a portion of the shank and is connected to the shank at one or more other points to unite the head and shank in a strong and rigid relation capable of withstanding any force tending to separate the head from the shank of the fastener either during the application thereof or after a period of use in a completed installation.

With the foregoing and other objects in view, further objects and advantages and other new and useful features in the construction, arrangement and general combination of parts will be readily apparent as the following description proceeds with reference to the accompanying drawings, for purposes of illustration but not of limitation, in which like reference characters designate like parts throughout the same, and in which.

Figures 1, 2, 3:
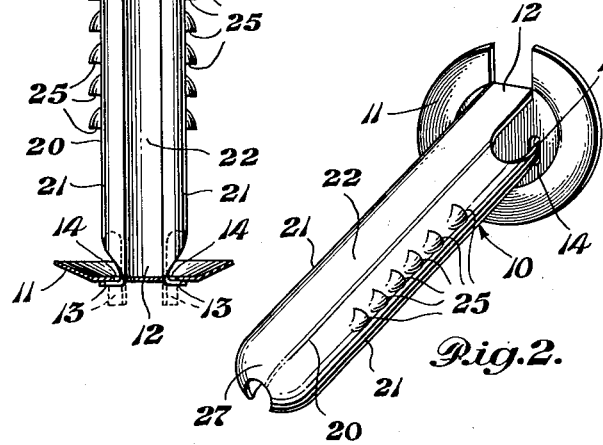
Fig. 1 is an elevational view of the improved snap stud fastener with the head member thereof shown in section.
Fig. 2 is a perspective view of the fastener showing the rear wall and one side of the fastener.
Fig. 3 is a sectional view showing the fastener as applied to secure the parts of an installation.
Figures 4, 6, 7:
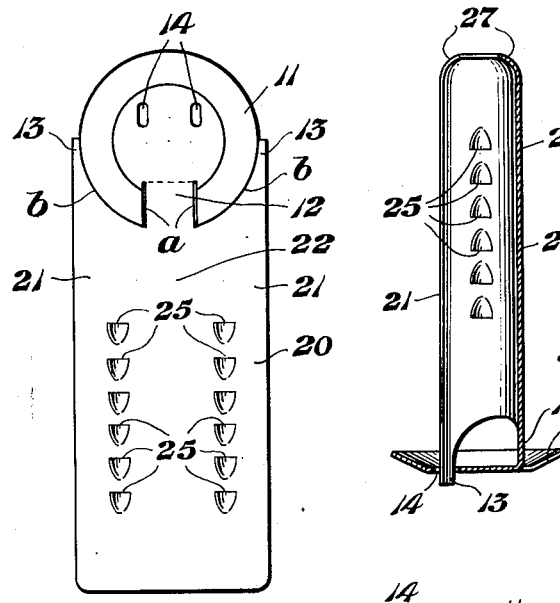
Fig. 4 is a sectional view of Fig. 3 taken on line 4—4, looking in the direction of the arrows.
Fig. 6 illustrates a blank from which the improved fastener is made and showing the initial steps in forming the blank.
Figures 5, 8:
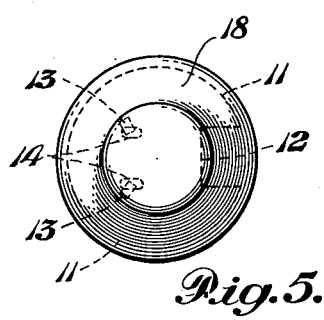
Fig. 5 is a plan view of the fastener, showing the head member thereof.

Fig. 7 is a sectional view showing the step in making the fastener wherein the blank of Fig. 6 is bent to define the channel-shaped snap stud shank and to form the connection thereof with the head member of the fastener, prior to the operation for completing the fastener as shown in Fig. 1; and, Fig. 8 is a bottom plan view of Fig. 7 showing the head member of the fastener as formed just prior to the operation for completing the fastener.

Referring now, more particularly, to the drawings, Figs. 1 and 2 show a preferred form of the improved snap stud fastener and Fig. 3 the relation in which it is used in an installation on being applied to fastening engagement in an aperture in a supporting wall such as an automobile dash panel. The supporting wall may be of any suitable sheet metal, wood or fibre material, but usually is in the form of a metallic panel or plate-like member A which is provided with fastener receiving openings at regular intervals and at suitably spaced points along which the trim material or insulation pad extends in mounted position. Such openings may be either round, rectangular or of any other suitable outline but generally are provided in the manner of circular holes 1, Figs. 3 and 4, which involve the least cost inasmuch as only the simplest punching or drilling tools are required.

Adjacent the panel A, there is provided a layer of insulation B formed of any selected material such as cork, jute, hair, etc., or a combination of any such suitably held together in a relatively thick substantial pad which is usually soft and flexible and may be readily compressed in the application of the snap studs to fastening position. The insulation pad is perforated in any suitable manner to receive the shank of the fastener applied to the opening 1 in the supporting wall or dash panel A, and a covering of trim material C made of cardboard, fibre board, or the like, and having a stud passage 5, is secured over the insulation pad to provide a neat finished appearance to the interior of the car body or other structure.

The snap stud fastener, designated generally 10, is made in a simplified design from a blank such as shown in Fig. 6, which is readily obtained from any standard sheet metal strip stock, preferably of a spring metal nature such as spring steel or cold rolled steel having spring characteristics. One end of the blank is designed to provide the generally channel-shaped shank 20 of the fastener which, of course, may be of any desired length and width. The opposite end of the blank defines a disk-like head member 11 which is integrally connected to the shank by a web portion 12 defined by spaced longitudinal slits $a$. Arcuate slits $b$ on either side of said web portion complete the generally circular configuration of the head member 11 and define tongues 13 adjacent said head member along the longitudinal edges of the blank.

When the blank body 20 is bent into the generally channel-shaped shank structure of the fastener illustrated in Fig. 2, said tongues 13 are in position to extend through holes 14 in the head member 11 of the fastener substantially as shown in Figs. 2, 7 and 8, and as indicated by dotted lines in Fig. 1. In the completion of the fastener, the extremities of said tongues 13 are bent generally outwardly and flattened against the outer surface of the head member as shown in Fig. 1 and as represented by dotted lines in Fig. 5. The head member 11 accordingly, is attached to the shank by the integral web portion 12 and by the spaced tongues 13 in a relatively strong connection which is adapted to withstand any tendency of the head member to separate from the shank either in the application of the fastener or incidental to its use in a completed installation. In heretofore known fasteners of this character in which the head member is provided by an end portion of the blank bent generally normal to the shank, the head member would be subject to spreading apart from the shank under ordinary tensile loads and axial forces on the shank with the result that the fasteners frequently worked loose from applied fastening position. In the fastener construction of the present invention, however, the bent over tongues 13 extending through the holes 14 in the head member cooperate with the integral web 12 to rigidify the connection of the head member to the shank and otherwise provide a unitary head and shank construction of high strength and durability in which the head member is secured throughout in fixed relation to the shank and is thereby capable of resisting any load or axial force on the fastener as employed in installations of the kind described.

The head member 11 is slightly dished in the completed fastener such that the circular peripherial edge thereof effects a seal around the passage 5 in the adjacent trim material C in order to obstruct the entrance of foreign matter into the interior of the vehicle or other structure. In a further relation, the head member may be provided with better sealing qualities by the use of a coating of neoprene, or, as shown in Figs. 3 and 5, by the use of a cap member 18 of rubber or plastic or a composition thereof which is snapped over the head member to cover the holes 14 therein and otherwise present an annular, imperforate button-like surface which effectively seals the opening 5 in the adjacent panel C against the passage of heat, smoke and odors from the vehicle motor as well as prevents the entrance of dust, water and other foreign matter into the interior of the vehicle.

The shank portion 20 of the blank is bent into a generally channel-shaped formation comprising relatively yieldable shank sections 21 on either side of the central wall or shank section 22. If desired, the shank sections 21 may be designed for increased flexibility and yielding ability relative to each other by providing suitable slots, slits or other weakening means in the central wall member 22. The shank sections 21 in the generally channel-shaped shank preferably have a rounded contour conforming generally to the contour of the circular panel opening 1 for most effective bearing engagement with the edges thereof as seen in Fig. 4.

The shank portion is provided with one, two or more series of securing shoulders or abutments 25 extending longitudinally thereof. Preferably a series of abutments is provided on each of the shank sections 21 as seen in Figs. 1 and 3. In the present example, such abutments or shoulders 25 are provided in an improved, highly effective design by a series of spaced transverse slits on each of the relatively yieldable shank sections 21. The metal adjacent each slit is pressed outwardly out of the plane of the shank section in a manner whereby the slit edge defines a sharp, protruding abutment extending generally perpendicular to the plane of the associated shank section and having an inclined surface tapering inwardly from any such abutment into the plane of the shank section. The series of shoulders or abutments thus provided on each of the shank sections 21 are equally spaced to provide a series of laterally opposed pairs of abutments 25 which cooperate in securing the shank at spaced points in the panel opening. The series of laterally opposed pairs of abutments, otherwise, are so arranged axially of the shank that any pair is adapted to provide the desired securing action in the panel opening 1 depending on the combined thickness of the secured parts A, B, C of the installation.

The shank sections 21 are otherwise tapered or rounded inwardly toward the leading end of the fastener to define a blunt point or pilot 27 which is adapted to be received readily in the panel opening 1. When normally untensioned, said shank sections 21 diverge or taper outwardly from the pilot 27 in a gradually increasing spaced relation greater than the size of said panel opening 1. Accordingly, in the application of the snap stud to secure an installation such as shown in Fig. 3, the blunt pilot 27 or leading end of the fastener is passed through the passage 5 in the trim material C, and through the relatively soft, porous layer of insulation B until said pilot 27 is received in the panel opening 1. The fastener is then advanced to final applied position by exerting suitable pressure on the head member 11 to compress the trim material C and insulation B as the leading end of the shank is forced through the panel opening 1.

As pressure is exerted on the head member 11, the flexible shank sections 21 adjacent the pilot 27 of the fastener cam against the walls of the panel opening 1 in a manner whereby said shank sections are compressed and seated in the panel opening under continuously effective spring tension. Inasmuch as the shank sections 21 define, essentially, longitudinal corrugations which stiffen and rigidify the same, said shank sections easily withstand the aforesaid compressive forces and are otherwise firmly and rigidly disposed in engagement with opposing edge portions of the panel opening. Moreover, the outer rounded shape of said shank sections, conforming to the contour of the panel opening, is such as to seat said shank sections in uniform bearing engagement with the edge portions of the panel opening as shown in Fig. 4.

In this relation, the abutments or shoulders 25 on the compressed shank sections 21 are adapted to snap through the panel opening 1 and lock the snap stud in fully applied position. Any pair of laterally opposed shoulders or abutments 25 is adapted to secure the stud in applied position as determined by the combined thickness of the parts of the installation such that when the stud is pushed completely home, the pair of abutments 25 just clearing the panel opening 1 is the effective pair locking the stud in applied fastening position. In the present example, the installation is shown secured by the first pair of laterally opposed abutments 25 adjacent the pilot 27 as illustrated in Fig. 3. The sharp outwardly projecting design of said abutments 25 is such that they engage substantial marginal portions of the panel A adjacent the opening 1 and at spaced points which prevents any tilting or other movement of the shank which might tend to displace or dislodge the fastener from fully applied fastening position. The abutments 25 otherwise are maintained positively in such locking relation with the panel A, Fig. 3, by the outward expansive force of the shank sections 21 in compressed relation in the panel opening, as aforesaid.

It will be understood that when the combined thickness of the parts secured is less than that shown in Fig. 3, the leading end of the fastener projects beyond the panel A a proportionately greater amount in which event the pair of laterally opposed abutments 25 just clearing the panel opening 1 are effective to lock the fastener in securing position. In any case, the application of the fastener is easily and quickly effected by an axial thrust-like motion imparted to the snap stud by pressure exerted on the head member 11, whereupon the pairs of laterally opposed abutments 25 ratchet over the edge of the panel opening until the parts of the installation are suitably clamped by the head member 11 against the panel A. In this position, the pair of laterally opposed abutments 25 just clearing the panel opening lock the snap stud in fully applied fastening position firmly and rigidly securing the parts of the installation under constant spring tension.

Upon removal of pressure from the head member 11 of the stud, the compressed insulation material B naturally attempts to assume its initial condition and thus exerts an axial drawing action on the shank of the fastener such that, in this respect, the effective pair of abutments 25 positively engage the marginal portions of the panel opening 1 in locked relation thereto, and with the layer of insulation firmly secured to the supporting panel A in a tight, rigid connection which is not subject to loosening or displacement incidental to vibration or shock taking place in the operation of the automobile or other structure in which the described installation may be employed.

It is to be noted that the leading end or pilot 27 of the fastener extends only a relatively slight amount beyond the reverse side of the dash panel or other supporting panel A such that there is no objectionable protruding portion which might become entangled with ignition wires, etc., beneath the hood. In the event that it becomes necessary or desirable to remove the fastener, this is easily effected simply by compressing the shank sections 21 toward each other until the pair of engaged abutments 25 disengage the marginal portions of the panel opening and lie within the outline thereof as necessary to permit the shank to be withdrawn in a direction reverse to that in which the fastener was applied.

It will be understood that in any case, the shank of the fastener is substantially rigid and can be provided in practically any required length in the manner of an elongated stud without affecting the efficiency thereof or the effectiveness of its holding action in an installation. The fastener is therefore admirably suited for use in fastening relatively thick parts in an installation, and is particularly effective in securing material such as insulation pads and trim material to the dash of an automobile separating the body of the vehicle from the space in which the motor is located beneath the hood. Although the present disclosure is described in connection with such an automobile dash installation, it is to be understood that the invention also fully contemplates the use of the improved snap studs in any related or equivalent type of construction.

While the invention has been described in detail with a specific example, such example is intended as an illustration only, since it will be apparent to those skilled in the art that other modifications in the construction, arrangement and general combination of parts thereof may be devised without departing from the spirit and scope of the invention. The present embodiment is therefore to be considered in all respects as illustrative and not restrictive, the scope of the invention being indicated by the appended claims rather than by the foregoing description, with all changes falling within the scope, meaning and range of equivalency of the claims intended to be embraced therein.

What is claimed is:

1. A fastener comprising a sheet metal body defining a channel-shaped shank including a pair of spaced relatively yieldable shank sections and a head having an opening therein and attached to said shank by a bent portion, and a tongue on at least one of said shank sections extending through said opening in the head and secured in said opening to connect said head and shank in addition to said bent portion.

2. A fastener comprising a sheet metal body defining a channel-shaped shank including a pair of spaced relatively yieldable shank sections and a head having spaced openings therein and attached to said shank by a bent portion, and a tongue on each of said shank sections extending through said spaced openings in the head and secured in said openings to connect said head and shank in addition to said bent portion.

3. A fastener comprising a sheet metal body defining a channel-shaped shank including a pair of spaced relatively yieldable shank sections and a head having an opening therein and attached to said shank by a bent portion, a tongue on at least one of said shank sections extending through said opening in the head and secured in said opening to connect said head and shank in addition to said bent portion, and a series of abutments on at least one of said shank sections extending longitudinally thereof and facing said head of the fastener.

4. A fastener comprising a sheet metal body defining a channel-shaped shank including a pair of spaced relatively yieldable shank sections and a head having spaced openings therein and attached to said shank by a bent portion, and a tongue on each of said shank sections extending through said spaced openings in the head and secured in said openings to connect said head and shank in addition to said bent portion, and a series of abutments on each of said shank sections extending longitudinally thereof and facing said head of the fastener.

5. A fastener comprising a sheet metal body defining a channel-shaped shank including a pair of spaced relatively yieldable shank sections and a head attached to said shank by a bent portion, a tongue on at least one of said shank sections secured in an opening in the head to connect said head and shank in addition to said bent portion, a series of abutments on at least one of said shank sections extending longitudinally thereof, said abutments facing said head of the fastener and being provided by a series of spaced transverse slits with the metal adjacent a slit bent outwardly out of the plane of the shank section so that the edge of the slit defines the abutment.

6. A fastener comprising a sheet metal body defining a channel-shaped shank including a pair of spaced relatively yieldable shank sections tapering into a pilot at the leading end of the fastener, a head provided with spaced openings attached to said shank by a bent portion, a tongue on each of said shank sections secured in said spaced openings in the head to connect said head and shank in addition to said bent portion, a cap device covering said head and concealing the openings therein, and a series of abutments on each of said shank sections extending longitudinally thereof, said abutments facing said head of the fastener and being provided by series of spaced transverse slits with the metal adjacent a slit bent outwardly out of the plane of the shank section so that the edge of the slit defines an abutment.

7. A fastener comprising a sheet metal body defining a channel-shaped shank including a pair of spaced relatively yieldable shank sections tapering into a pilot forming a blunt point on the fastener, and a head provided with spaced openings attached to said shank by a bent portion, a tongue on the longitudinal edge of each of said shank sections secured in said spaced openings in the head to connect said head and shank in addition to said bent portion, a cap device covering said head and concealing the openings therein, and a series of abutments on each of said shank sections extending longitudinally thereof, said abutments facing said head of the fastener and being provided by a series of spaced transverse slits with the metal adjacent each slit bent outwardly out of the plane of the shank section so that the edges of said slits define the series of abutments.

GEORGE A. TINNERMAN.

REFERENCES CITED

The following references are of record in the file of this patent:

UNITED STATES PATENTS

| Number | Name | Date |
|---|---|---|
| 256,117 | Bray | Apr. 11, 1882 |
| 321,864 | Taylor | July 7, 1885 |
| 670,922 | Marquardt | Mar. 26, 1901 |
| 792,135 | Jackson | June 13, 1905 |
| 1,545,402 | Coyne | July 7, 1925 |
| 1,691,013 | Johnson | Nov. 6, 1928 |
| 2,110,959 | Lombard | Mar. 15, 1938 |
| 2,125,060 | Barnes et al. | July 26, 1938 |
| 2,391,298 | Davis | Dec. 18, 1945 |
| 2,438,499 | Hartman | Mar. 30, 1948 |